United States Patent [19]

Mittelhauser

[11] Patent Number: 4,828,215
[45] Date of Patent: May 9, 1989

[54] EXTERNAL REARVIEW MIRROR FOR VEHICLES

[76] Inventor: Bernhard Mittelhauser, Am Krähenberg, D-3002 Wedemark 2, Fed. Rep. of Germany

[21] Appl. No.: 202,187

[22] Filed: Jun. 2, 1988

[30] Foreign Application Priority Data

Jun. 2, 1987 [DE] Fed. Rep. of Germany ....... 3718432

[51] Int. Cl.⁴ ............................................. A47G 1/24
[52] U.S. Cl. .................................. 248/484; 74/502.1; 350/635
[58] Field of Search ............... 248/484, 481, 483, 484, 248/485, 486, 487, 476, 478, 479; 350/632, 635; 74/502.1

[56] References Cited

U.S. PATENT DOCUMENTS

| | | | |
|---|---|---|---|
| 4,558,840 | 12/1985 | Manzoni | 248/484 X |
| 4,626,083 | 12/1986 | Nakayama et al. | 350/604 |
| 4,636,045 | 1/1987 | Suzuki | 350/632 X |
| 4,645,170 | 2/1987 | Sharp | 248/484 X |
| 4,755,033 | 7/1988 | Whitehead et al. | 248/483 X |

FOREIGN PATENT DOCUMENTS

| | | | |
|---|---|---|---|
| 2612631 | 10/1976 | Fed. Rep. of Germany | 248/487 |
| 0053444 | 3/1985 | Japan | 350/635 |
| 1208514 | 10/1970 | United Kingdom | 248/481 |
| 1431778 | 4/1976 | United Kingdom | 248/481 |

*Primary Examiner*—Ramon O. Ramirez
*Attorney, Agent, or Firm*—Becker & Becker, Inc.

[57] ABSTRACT

An external rearview mirror for a vehicle, with adjustment of the mirror being effected by a hand lever that removably engages in a funnel-like adjustment member that is disposed within a pivotable housing for the mirror body. In order in an operative position of the mirror to always assure a positive connection between the adjustment member and the hand lever, the adjustment member, with a resilient restoring force, rests against the hand lever in the operative position of the mirror, and rests against a stop in a non-operative, swung in or swung out position of the mirror. This restoring force is preferably effected by a torsion spring.

6 Claims, 1 Drawing Sheet

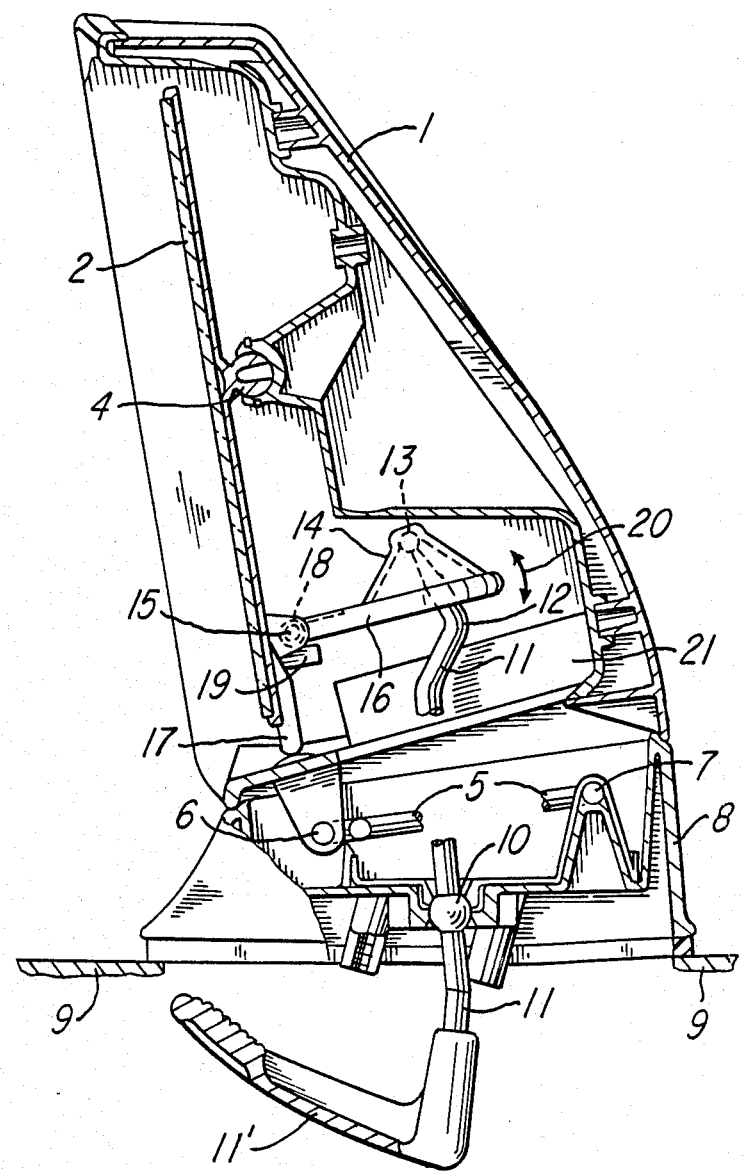

EXTERNAL REARVIEW MIRROR FOR VEHICLES

BACKGROUND OF THE INVENTION

The present invention relates to an external side view or rearview mirror for a vehicle, with the mirror including a housing that can be swung away or toward the vehicle about one or more shafts that are disposed at least approximately vertically. A mirror body is adjustably mounted in the housing and is movable via a hand lever that is pivotably mounted on a base of the housing, with this hand lever having an end that faces the mirror body and that removably extends into a funnel-like adjustment member that is open in the direction toward the vehicle.

As a result of the funnel-like shape of the adjustment member, when the housing is swung back into an operative position, no matter what the position of the hand lever, that end of the latter that faces the housing will always return to its operative position. Nevertheless, especially after having been in operation for a long period of time, it is impossible to prevent play from occurring between the adjustment member and the hand lever. This play can result from being out of true and from wear. As a consequence of this play, inaccuracies in the adjustment of the mirror are encountered.

It is therefore an object of the present invention to improve a mirror of the aforementioned general type in such a way that a secure and reliable contact is maintained between the hand lever and the adjustment member, thereby assuring a high degree of precision of any adjustment made to the mirror.

BRIEF DESCRIPTION OF THE DRAWING

This object, and other objects and advantages of the present invention, will appear more clearly from the following specification in conjunction with the accompanying schematic drawing, which is an essentially horizontal, cross-sectional view through one exemplary embodiment of the inventive mirror for a motor vehicle.

SUMMARY OF THE INVENTION

The mirror of the present invention is characterized primarily by means that are connected to the adjustment member to assure that in an operative position of the mirror, the adjustment member rests against the hand lever, and in a non-operative, swung in or out position of the mirror, the adjustment member rests, with a resilient return or restoring force, against stop means that are disposed on the mirror body.

Accordingly, a restoring force works upon the adjustment member. This restoring force is preferably effected by a spring, which with the generally pivotable mounting of the adjustment member is embodied as a torsion spring. Under the effect of this spring, contact between the adjustment member and the free end of the hand lever is always assured in the operative position of the mirror, regardless of whether certain mechanical changes have occurred, or whether or not tolerance differences exist. If the housing is pivoted out of an operative position, in other words toward or away from the housing, the adjustment member rests against a small stop in an elastically resilient manner under the aforementioned force. When the housing is pivoted back into its operative position, this slight restoring force must be overcome, and is still effective when the mirror has again assumed its operative working position.

Further specific features of the present invention will be described in detail subsequently.

DESCRIPTION OF PREFERRED EMBODIMENTS

Referring now to the drawing in detail, the open portion of an approximately shell-shaped housing 1 accommodates a mirror body 2 that can be adjusted in all directions via a ball-and-socket joint 4. For safety reasons, the housing 1 can be pivoted or swung away, in a known manner, via the lever arm or linkage 5 about two approximately vertical shafts 6, 7, either in the direction of travel or longitudinal direction of the vehicle, or in the opposite direction. The linkage 5, as well as the associated shafts 6, 7, are mounted on the base 8, which is secured to the vehicle, the latter being indicated by the reference numeral 9; the base 8 is provided with a ball-and-socket joint 10 for a hand lever 11. That end of the hand lever 11 that extends into the interior of the vehicle is embodied as a handle 11', while the outwardly directed and bent end 12 of the hand lever 11 extends into the housing 1 and carries a ball 13. This ball 13 is disposed in the base of a funnel-like element 14 that is open in the direction toward the vehicle. The funnel-like element 14 is part of an adjustment member 16 that is pivotable to a limited extent about an approximately vertical shaft 15 on the mounting of the mirror body 2. A vibration damper is indicated by the reference numeral 17.

A torsion spring 18 acts upon the adjustment member 16 and always assures that the ball 13 does not lose contact with the base of the funnel-like element 14. By turning and pivoting the hand lever 11, the ball 13 acts upon the funnel-like element 14, and hence upon the mirror body 2, in order in this way to be able to carry out the desired adjustment of the mirror body. Therefore, even during vibrations and wear, a frictional connection is maintained within the funnel-like element 14.

If the housing 1 is swung out about one of the two shafts 6 or 7, the end 12 of the hand lever 11 leaves the funnel-like element 14. However, at first the funnel-like element 14 tries to follow the ball 13, under the effect of the torsion spring 18, in the direction toward the base 8; however, the funnel-like element 14 or the adjustment member 16 soon abuts against a stop member 19 that is disposed on the mounting of the mirror body 2. The adjustment member 16 maintains this position until the housing 1 is again swung into the operating position illustrated in the drawing.

The pivoting possibilities for the adjustment member 16 are indicated by the double arrow 20.

In order to keep the funnel-like element 14 as small as possible, while at the same time assuring that the ball 13 will be trapped in the various positions, it would additionally be possible, on both sides of that entry opening of the housing 1 that faces the vehicle and into which the end 12 of the hand lever 11 must extend when the housing 1 is swung back, to provide at the top and/or at the bottom a guide plate 21 that is disposed at an angle much like the guide surfaces of the funnel-like element 14. If the ball 13 strikes the guide plate 21, the ball 13 will be deflected in the direction of the funnel-like element 14, accompanied by pivoting of the hand lever 11.

The present invention is, of course, in no way restricted to the specific disclosure of the specification and drawing, but also encompasses any modifications within the scope of the appended claims.

What I claim is:

1. In an external side view or rearview mirror for a vehicle, with said mirror including a housing that can be swung away and/or toward said vehicle about one or more shafts that are disposed at least approximately vertically when said mirror is mounted on said vehicle, and with said mirror further including a mirror body that is adjustably mounted in said housing and is movable via a hand lever that is pivotably mounted on a base of said housing, with said hand lever having an end that faces said mirror body and that removably extends into a funnel-like adjustment member that is diposed in said housing and is open in the direction toward said vehicle, the improvement comprising:

means connected to said adjustment member to assure that, with a resilient restoring force, in an operative position of said mirror said adjustment member rests against said hand lever, and in a nonoperative, swung in or out position of said mirror said adjustment member rests against stop means disposed on said mirror body, said adjustment member being pivotably mounted in said housing.

2. A mirror according to claim 1, in which said adjustment member is pivotably mounted on an approximately vertical shaft.

3. A mirror according to claim 1, in which said means that effects said resilient restoring force is a torsion spring.

4. A mirror according to claim 1, in which said means that effects said resilient restoring force traps said adjustment member against said stop means in said nonoperative, swung in or out position of said mirror.

5. In an external side view or rearview mirror for a vehicle, with said mirror including a housing that can be swung away and/or toward said vehicle about one or more shafts that are disposed at least approximately vertically when said mirror is mounted on said vehicle, and with said mirror further including a mirror body that is adjustably mounted in said housing and is movable via a hand lever that is pivotably mounted on a base of said housing, with said hand lever having an end that faces said mirror body and that removably extends into a funnel-like adjustment mmber that is disposed in said housing and is open in the direction toward said vehicle, the improvement comprising:

means connected to said adjustment member to assure that, with a resilient restoring force, in an operative position of said mirror said adjustment member rests against said hand lever, and in a nonoperative, swung in or out position of said mirror said adjustment member rests against stop means disposed on said mirror body, said mirror body being provided with a mounting means to which are secured said adjustment member and said stop means.

6. In an external side view o rearview mirror for a vehicle, with said mirror including a housing that can be swung away and/or toward said vehicle about one or more shafts that are disposed at least approximately vertically when said mirror is mounted on said vehicle, and with said mirror further including a mirror body that is adjustably mounted in said housing and is movable via a hand lever that s pivotably mounted on a base of said housing, with said hand lever having an end that faces said mirror body and that removably extends into a funnel-like adjustment member that is disposed in said housing and is open in the direction toward said vehicle, the improvement comprising:

means connected to said adjustment member to assure that, with a resilient restoring force, in an operative position of said mirror said adjustment member rests against said hand lever; and in a nonoperative, swung in or out position of said mirror said adjustment member rests against stop means disposed on said mirror body, said housing having an opening to allow said hand lever to extend therein, with said opening having a rim on which is provided at least one guide plate that is inclined as are inner surfaces of a funnel-like portion of said adjustment member.

* * * * *